(12) United States Patent
Heit

(10) Patent No.: US 11,430,423 B1
(45) Date of Patent: Aug. 30, 2022

(54) METHOD FOR AUTOMATICALLY TRANSLATING RAW DATA INTO REAL HUMAN VOICED AUDIO CONTENT

(71) Applicant: Weatherology, LLC, Woodbury, MN (US)

(72) Inventor: Derek Christopher Heit, Maple Plain, MN (US)

(73) Assignee: Weatherology, LLC, Woodbury, MN (US)

( * ) Notice: Subject to any disclaimer, the term of this patent is extended or adjusted under 35 U.S.C. 154(b) by 351 days.

(21) Appl. No.: 16/386,358

(22) Filed: Apr. 17, 2019

Related U.S. Application Data

(60) Provisional application No. 62/659,806, filed on Apr. 19, 2018.

(51) Int. Cl.
| | |
|---|---|
| *G10L 13/027* | (2013.01) |
| *G10L 13/047* | (2013.01) |
| *G01W 1/00* | (2006.01) |
| *H04W 4/02* | (2018.01) |
| *H04W 4/38* | (2018.01) |

(52) U.S. Cl.
CPC ............ *G10L 13/047* (2013.01); *G01W 1/00* (2013.01); *G10L 13/027* (2013.01); *H04W 4/02* (2013.01); *H04W 4/38* (2018.02)

(58) Field of Classification Search
CPC ...... G10L 13/047; G10L 13/024; H04W 4/38; H04W 4/02
See application file for complete search history.

(56) References Cited

U.S. PATENT DOCUMENTS

| | | | |
|---|---|---|---|
| 6,297,766 B1 | 10/2001 | Koeller | |
| 6,590,529 B2 | 7/2003 | Schwoegler | |
| 6,917,297 B2 | 7/2005 | Andrews et al. | |
| 8,060,308 B2 | 11/2011 | Breed | |
| 8,519,860 B2 | 8/2013 | Johnson et al. | |
| 9,246,610 B2 * | 1/2016 | Johnson | H04L 67/20 |
| 9,508,338 B1 * | 11/2016 | Kaszczuk | G10L 13/02 |
| 2001/0056347 A1 * | 12/2001 | Chazan | G10L 13/07 704/258 |
| 2006/0241865 A1 * | 10/2006 | Smith | H04W 4/02 702/3 |
| 2011/0054776 A1 | 3/2011 | Petrov et al. | |

OTHER PUBLICATIONS

"Quick Tip: How to Insert Silence in Adobe Audition" YouTube video from Mike Murphy Co (Apr. 28, 2017, link: https://www.youtube.com/watch?v=WFZoj2x9yzk (Year: 2017).*

* cited by examiner

*Primary Examiner* — Pierre Louis Desir
*Assistant Examiner* — Keisha Y. Castillo-Torres
(74) *Attorney, Agent, or Firm* — Michael A. Bondi; Moss & Barnett

(57) ABSTRACT

A method for automatically translating raw data into real human voiced audio content is provided according to an embodiment of the present disclosure. The method may comprise ingesting data, separating the data into or associating the data with a data type, and creating a list of descriptive data associated with the data type. In some embodiments, the method further comprises compiling audio phrases types associated with the descriptive data, associating a pre-recorded audio file with each audio phrase, and merging a plurality of pre-recorded audio files to create a final audio file.

12 Claims, 10 Drawing Sheets

METHOD FOR AUTOMATICALLY TRANSLATING RAW DATA INTO REAL HUMAN VOICED AUDIO CONTENT

CROSS-REFERENCE TO RELATED APPLICATIONS

This Application claims benefit to Provisional application 62/659,806, filed Apr. 19, 2018, which is incorporated herein by this reference.

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

FIELD OF THE DISCLOSURE

The present disclosure relates generally to methods for processing raw data, including meteorological data, according to various embodiments.

BACKGROUND OF THE DISCLOSURE

Meteorological information and delivery of such information is may be an extremely time sensitive operation. Conditions and threats may change by the second, and the data describing such events is often generated immediately and automatically as conditions change. As such, an improved method of providing such information to users in a timely and easily comprehensible manner is desirable.

SUMMARY OF THE DISCLOSURE

Various inventive features are described below that can each be used independently of one another or in combination with other features.

According to various embodiments, the present disclosure relates generally to methods for processing raw data so that information may be presented to a user in a friendly and understandable format. In some embodiments, the present disclosure relates to a method for ingesting raw data such as meteorological data in the form of text or other types of raw data and creating human voiced audio content describing and/or explaining the data in a way that is easily consumed or understood by the general public.

Meteorological information and delivery of such information may be an extremely time sensitive operation. Conditions and threats may change by the second, and the data describing such events is often generated immediately and automatically as conditions change. However, it may be difficult to deliver important information to people who may need the information in a timely manner. Existing technologies may facilitate in the creation of such information and/or people may interpret the relevant data and create textual or graphical representations of the data for distribution to the public through various channels. Often this information may only valid for very limited time periods and may have expired by the time many users are able to use and/or understand it.

In general, the public uses text or raw data, and textual or graphical representation of the data only to a limited extent to consume or understand weather related information. And typically, only a small fraction of important, time sensitive weather information may be used or understood by the general public through viewing textual and/or graphical representations, reading text, and/or interpreting data directly. While audio may often provide a more effective way of conveying such information, audio messaging is often choppy and/or automated (i.e. garbled), making understanding the information more difficult than desired.

Thus, according to various embodiments, the present disclosure provides an effective and enabled manner of providing audio weather alerts that sound like a real human voice. In some embodiments, the disclosed method may be used for providing other information including alerts, which may be sports and/or traffic related information.

Additionally, the present disclosure provides a method for automatically translating raw data into real human voiced audio content, according to various embodiments. In some embodiments, the disclosed method relates to meteorological data. In some embodiments the disclosed method may relate to other information such as sports information and/or traffic related data. The method may comprise ingesting data, separating the data into or associating the data with a data type, and creating a list of descriptive data associated with the data type.

In some embodiments, the method further comprises compiling audio phrases types associated with the descriptive data, associating a pre-recorded audio file with each audio phrase, and merging a plurality of pre-recorded audio files to create a final audio file.

In some embodiments, the data type may include a single period forecast. In some embodiments, the single period forecast may include a single day forecast. In some embodiments, separating the data into a data type may include separating the data into a plurality of data types including a series of single period forecasts that temporally follow each other. In some embodiments, the data types may include a five day forecast. In some embodiments, the descriptive data may include at least one of the following: temperature, cloud cover, wind speed, wind direction, day period. In some embodiments, the method further comprises compiling audio phrase types associated with the descriptive data including at least one of the following phrase types: maxt, dayp, wclouds, wind-s, and wind-d. In some embodiments, the method further comprises associating a pre-recorded audio file with each audio phrase. In some embodiments, the method further comprises merging a plurality of pre-recorded audio files to create a final audio file. In some embodiments, a plurality of pre-recorded audio files are associated with each audio phrase. In some embodiments, the plurality of pre-recorded audio files differ in content and/or length of time. In some embodiments, the length of time of the final audio file is calculated and/or compared to a desired range of the length of time of the final audio file. In some embodiments, the length of time of the final audio file is changed by selecting another of the plurality of pre-recorded audio files to create the desired final audio file with the desired length of time. In some embodiments, the length of time of the final audio file is changed by providing at least one breath break between two different data types and/or two different types of descriptive data to create the desired final audio file with the desired length of time.

A portable weather indicating device according to an embodiment of the present disclosure is also disclosed. The portable weather indicating device may comprise a processor, a wireless communication link coupled to the processor for receiving weather data from a source identified by at least one uniform resource locator (URL) accessible by the processor and for transferring the weather data to the processor, a global location device coupled to the processor for determining the location of the portable weather indicator, a housing that contains the processor, the wireless communication link, the global location device, the housing having dimensions configured to allow a person to hold the housing in one hand, and a speaker in communication with the processor. The processor may be configured to cause the speaker to emit a sound related to the final audio file produced by any embodiment of any method discussed herein.

In some embodiments, such method automatically translates raw data into real human voiced audio content, and may comprise: ingesting data; separating the data into or associating the data with a data type; creating a list of descriptive data associated with the data type; compiling audio phrase types associated with the descriptive data including at least one of the following phrase types: maxt, dayp, wclouds, wind-s, and wind-d; associating a pre-recorded audio file with each audio phrase; and merging a plurality of pre-recorded audio files to create a final audio file.

In some embodiments, a plurality of pre-recorded audio files are associated with each audio phrase, wherein the plurality of pre-recorded audio files differ in content and/or length of time, wherein the length of time of the final audio file is calculated and/or compared to a desired range of the length of time of the final audio file, and wherein the length of time of the final audio file is changed by: a) selecting another of the plurality of pre-recorded audio files to create the desired final audio file with the desired length of time and/or b) providing at least one breath break between two different data types and/or two different types of descriptive data to create the desired final audio file with the desired length of time. In some embodiments, the portable weather indicating device is selected from the group of products comprising cellular phones, portable computers, tablets and personal data. assistants.

A system according to an embodiment of the present disclosure is also described herein. The system may comprise any weather indicating device with memory and a processor that are configured to execute any embodiment of any method discussed herein.

In some embodiments, such method automatically translates raw data into real human voiced audio content, and may comprise: ingesting data; separating the data into or associating the data with a data type; creating a list of descriptive data associated with the data type; compiling audio phrase types associated with the descriptive data including at least one of the following phrase types: maxt, dayp, wclouds, wind-s, and wind-d; associating a pre-recorded audio file with each audio phrase; and merging a plurality of pre-recorded audio files to create a final audio file.

In some embodiments, a plurality of pre-recorded audio files are associated with each audio phrase, wherein the plurality of pre-recorded audio files differ in content and/or length of time, wherein the length of time of the final audio file is calculated and/or compared to a desired range of the length of time of the final audio file, and wherein the length of time of the final audio file is changed by: a) selecting another of the plurality of pre-recorded audio files to create the desired final audio file with the desired length of time and/or b) providing at least one breath break between two different data types and/or two different types of descriptive data to create the desired final audio file with the desired length of time.

An electronic controller unit according to an embodiment of the present disclosure is provided. The electronic controller unit may comprise a memory including computer executable instructions for implementing any embodiment of any method discussed herein, and a processor coupled to the memory and configured to execute the computer executable instructions for implementing any embodiment of any method discussed herein.

In some embodiments, such method automatically translates raw data into real human voiced audio content, and may comprise: ingesting data; separating the data into or associating the data with a data type; creating a list of descriptive data associated with the data type; compiling audio phrase types associated with the descriptive data including at least one of the following phrase types: maxt, dayp, wclouds, wind-s, and wind-d; associating a pre-recorded audio file with each audio phrase; and merging a plurality of pre-recorded audio files to create a final audio file.

In some embodiments, a plurality of pre-recorded audio files are associated with each audio phrase, wherein the plurality of pre-recorded audio files differ in content and/or length of time, wherein the length of time of the final audio file is calculated and/or compared to a desired range of the length of time of the final audio file, and wherein the length of time of the final audio file is changed by: a) selecting another of the plurality of pre-recorded audio files to create the desired final audio file with the desired length of time and/or b) providing at least one breath break between two different data types and/or two different types of descriptive data to create the desired final audio file with the desired length of time.

According to various embodiments, the disclosed method and/or system may relate to other information, such as traffic and/or sports information, and may further relate to various devices for providing such information according to the disclosed method.

BRIEF DESCRIPTION OF THE DRAWINGS

The present subject matter will now be described in detail with reference to the drawings, which are provided as illustrative examples of the subject matter so as to enable those skilled in the art to practice the subject matter. Notably, the FIGS. and examples are not meant to limit the scope of the present subject matter to a single embodiment, but other embodiments are possible by way of interchange of some or all of the described or illustrated elements and, further, wherein.

Figure 1:
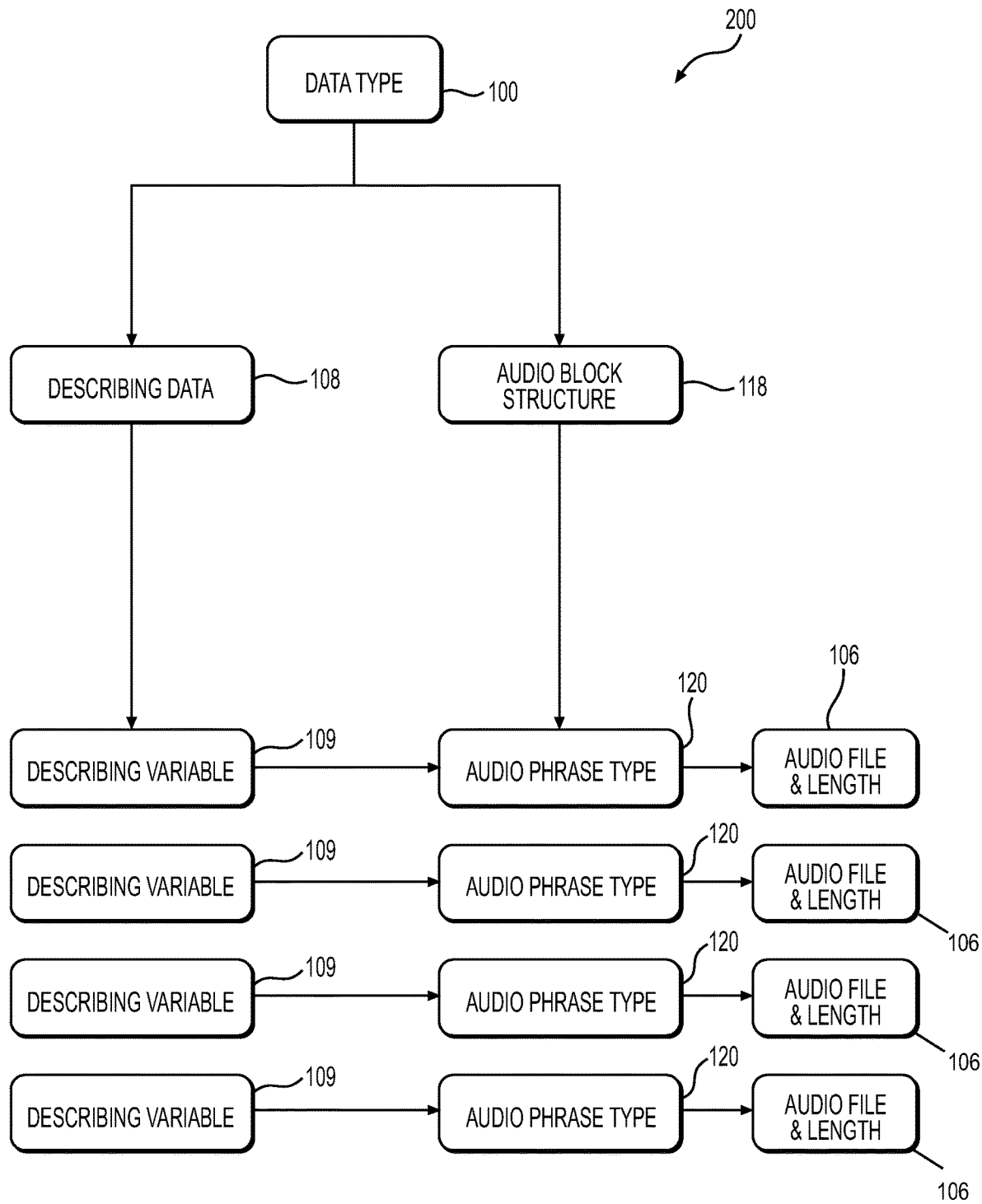
FIG. 1 is a flowchart describing a method for automatically translating raw data into real human voiced audio content according to an embodiment of the present disclosure, showing the initial steps.

While the disclosure is subject to various modifications and alternative forms, specific embodiments thereof are shown by way of example in the drawings and the accompanying detailed description. It should be understood, however, that the drawings and detailed description are not intended to limit the disclosure to the particular embodiments. This disclosure is instead intended to cover all modifications, equivalents, and alternatives falling within the scope of the present disclosure as defined by the appended claims.

DETAILED DESCRIPTION OF ILLUSTRATIVE EMBODIMENTS

The detailed description set forth below in connection with the appended drawings may be intended as a description of exemplary embodiments in which the presently disclosed process can be practiced. The term "exemplary" used throughout this description means "serving as an example, instance, or illustration," and should not necessarily be construed as preferred or advantageous over other embodiments. The detailed description includes specific details for providing a thorough understanding of the presently disclosed method and system. However, it will be apparent to those skilled in the art that the presently disclosed process may be practiced without these specific details. In some instances, well-known structures and devices are shown in block diagram form in order to avoid obscuring the concepts of the presently disclosed method and system.

In the present specification, an embodiment showing a singular component should not be considered limiting. Rather, the subject matter preferably encompasses other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present subject matter encompasses present and future known equivalents to the known components referred to herein by way of illustration. Although the device(s) here disclosed have been described in detail herein with reference to the illustrative embodiments, it should be understood that the description may be by way of example only and may be not to be construed in a limiting sense. It may be to be further understood, therefore, that numerous changes in the details of the embodiments of the disclosure will be apparent to, and may be made by, persons of ordinary skill in the art having reference to this description. It may be contemplated that all such changes and additional embodiments are within the spirit and true scope of this disclosure as claimed below.

Unless specifically stated otherwise, references to "a", "an", and/or "the" may include one or more than one and that reference to an item in the singular may also include the item in the plural. It is to be understood that the phrases "one or more" and "at least one" refer, for example, to instances in which one of the subsequently described circumstances occurs, and to instances in which more than one of the subsequently described circumstances occurs.

The term "optional" or "optionally" refer, for example, to instances in which subsequently described circumstances may or may not occur, and include instances in which the circumstance occurs and instances in which the circumstanced do not occur. The term "about" used in connection with a quantity is inclusive of the stated value and has the meaning dictated by the context (for example, it includes at least the degree of error associated with the measurement of the particular quantity). When used in the context of a range, the term "about" should also be considered as disclosing the range defined by the absolute values of the two endpoints. For example, the range "from about 2 to about 4" also discloses the range "from 2 to 4".

The detailed description of exemplary embodiments herein makes reference to the accompanying drawings, which show exemplary embodiments by way of illustration and its best mode, and not of limitation. While these exemplary embodiments are described in sufficient detail to enable those skilled in the art to practice the invention, it should be understood that other embodiments may be realized and that logical changes may be made without departing from the spirit and scope of the invention. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or a prime indicator such as 100', 100"etc. It is to be understood that the use of letters or primes immediately after a reference number indicates that these features are similarly shaped and have similar function as is often the case when geometry is mirrored about a plane of symmetry. For ease of explanation in this specification, letters or primes will often not be included herein but may be shown in the drawings to indicate duplications of features discussed within this written specification.

Various embodiments of a method for automatically translating raw data into real human voiced audio content will be described. In other embodiments, a portable weather indicating device such as a mobile phone (e.g. smart phones, cellular phones, etc.) that may benefit from the use of various embodiments of the method for automatically translating raw data into real human voiced audio content will be discussed. In some embodiments, such device may be used for other information such as traffic and/or sports data, according to the disclosed method. Also, an electronic control unit that may implement the various embodiments of a method for automatically translating raw data into real human voiced audio content and that may be used with a portable weather indicating device, and/or other information indicating device, will be described. A system that may use any method, weather indicating device, electronic control unit, etc. is also contemplated to be within the scope of the present disclosure.

Referring now to FIGS. 1 thru 7, a final audio product 134 may be eventually realized by using one or more data types 100. Data types 100 refer to what information is described within the ingested data 102. There can be any number of data types 100. A simple example of a data type 100 would be a single period dry forecast 104. In this embodiment, the goal of the method 200 would be to create an audio forecast describing a single period dry forecast 104 with a specified time length 106 or an unspecified time length. For each unique data type 100 the ingested data 102 is converted to specific variables describing that data type 100 (may be referred to as "describing data" 108 or "descriptive data". In this embodiment, temperature 110, cloud cover 112, wind speed 114, wind direction 116 and day period 117 would be entered into an array and used as the describing data 108 (a list of describing variables 109 or descriptive data) for the specific data type 100. Each data type 100 has its own specific and unique describing data format which consists of a list of describing data 108, and in turn is associated with specific audio block structures 118.

Audio block structures 118 and their associated audio phrase types 120 are often used as part of the translation process. Each data type 100 has at least one associated audio block structure 118. These structures 118 are a collection of audio phrase types 120 which describe or support the data contained in the describing data 108. In an exemplary embodiment, the audio block structure 118 would have the following audio phrase types 120: maxt 122, dayp 124, wclouds 126, wind-s 128, and wind-d 130. Each audio phrase type 120 is associated with a collection of pre-recorded audio files 132 each of which are designed to represent specific data provided by the describing data 108 of the data types 100. These audio phrase types 120 refer to phrases spoken in a very specific style of pronunciation and voice inflection. The audio phrase types 120 contained within an audio block structure 118 are ordered so that once merged into the final audio file 134, the final audio file 134 describes the data type 100 as expected with the desired natural style of the human voice.

FIG. 1 shows the specific aspects of the method and its components explained above along with their relationships to each other.

Figure 2:
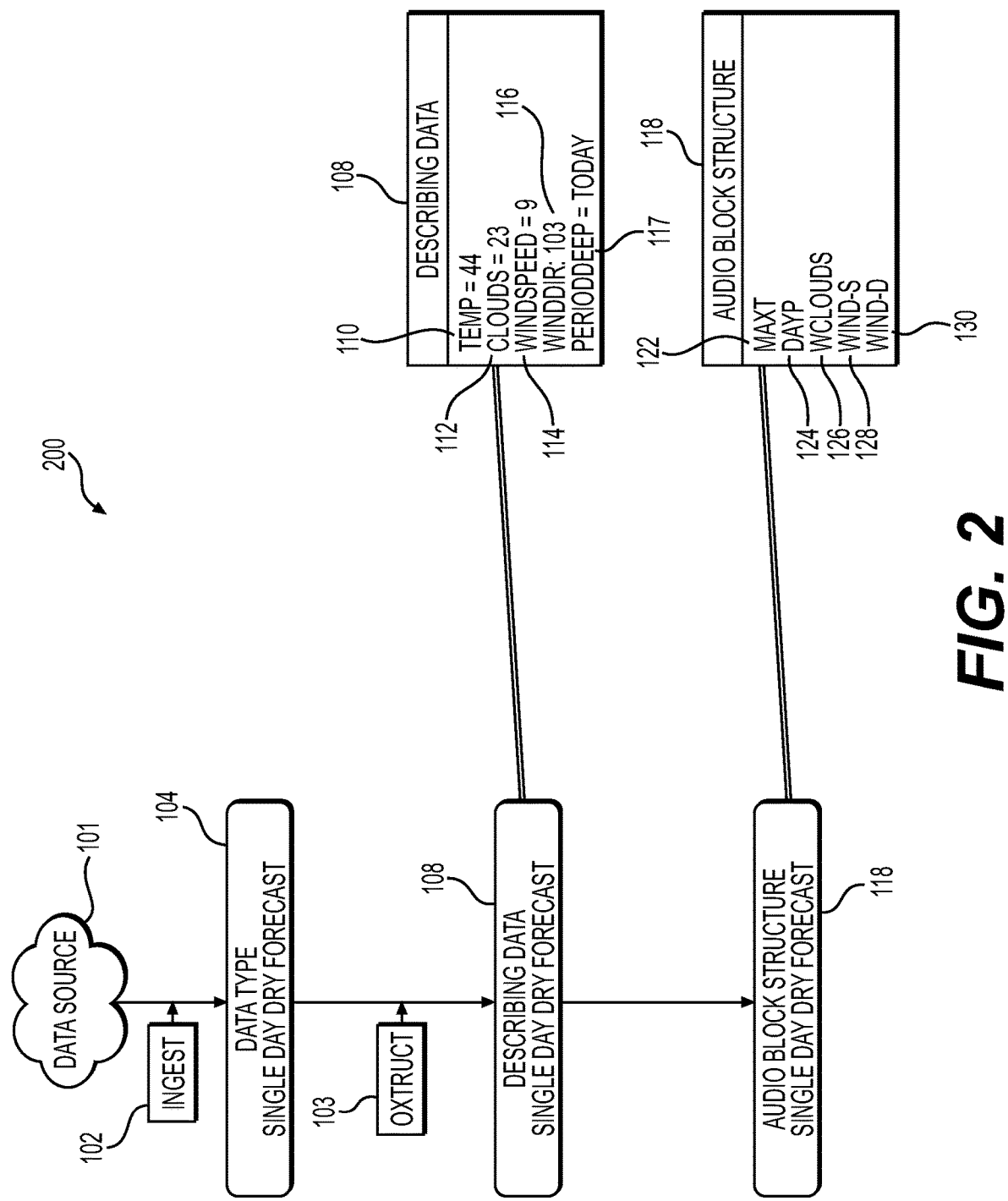
FIG. 2 is a flowchart showing a portion of the flowchart of FIG. 1 in more detail, giving examples of the "Describing Data" and "Audio Block Structure" steps depicted in the flowchart of FIG. 1.
Figure 3:
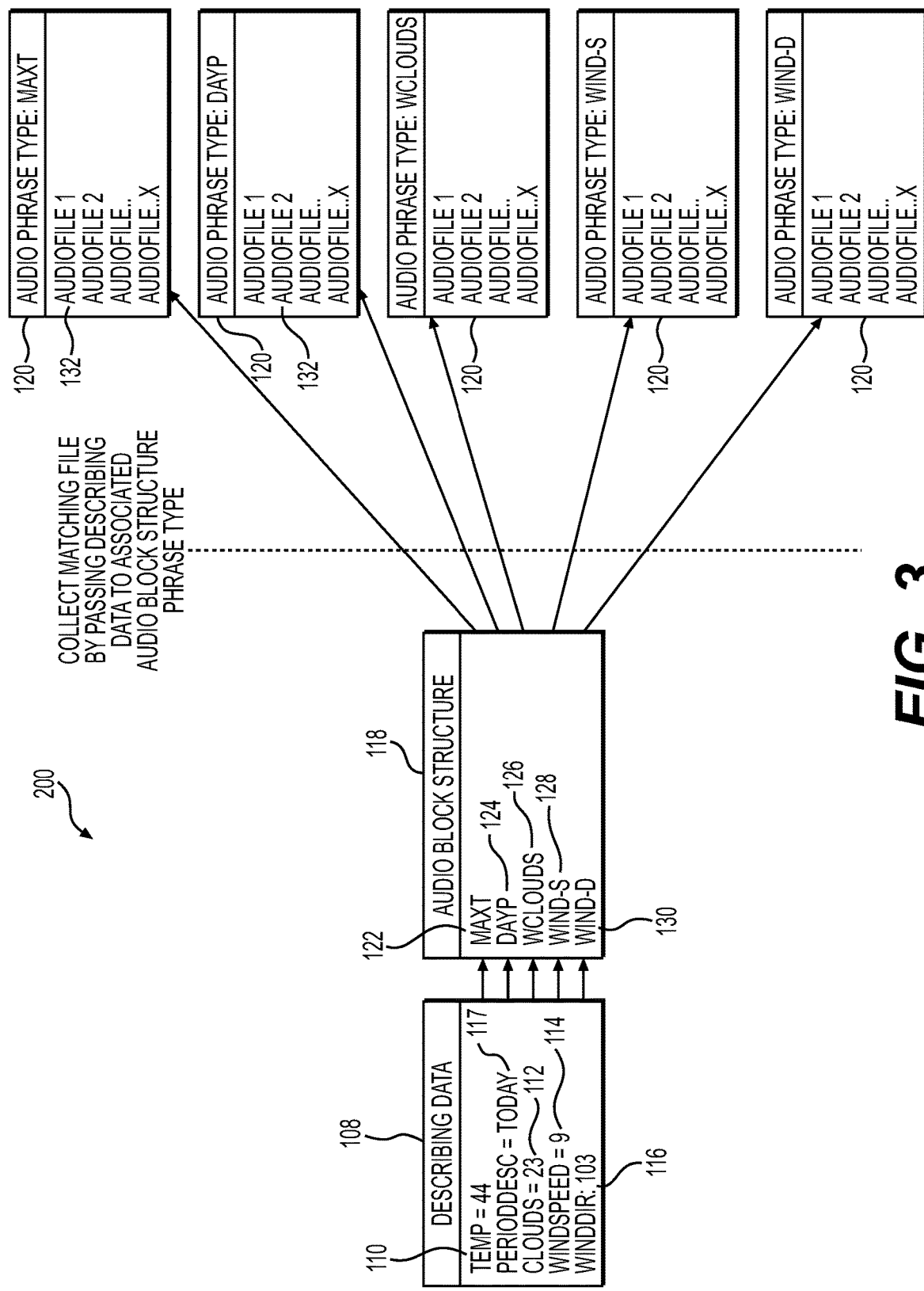
FIG. 3 is a flowchart showing more steps of the method disclosed in FIGS. 1 and 2, giving examples of the "Audio Block Structure" and "Audio Phrase Type" portions of the flowchart of FIG. 1.
Figure 4:
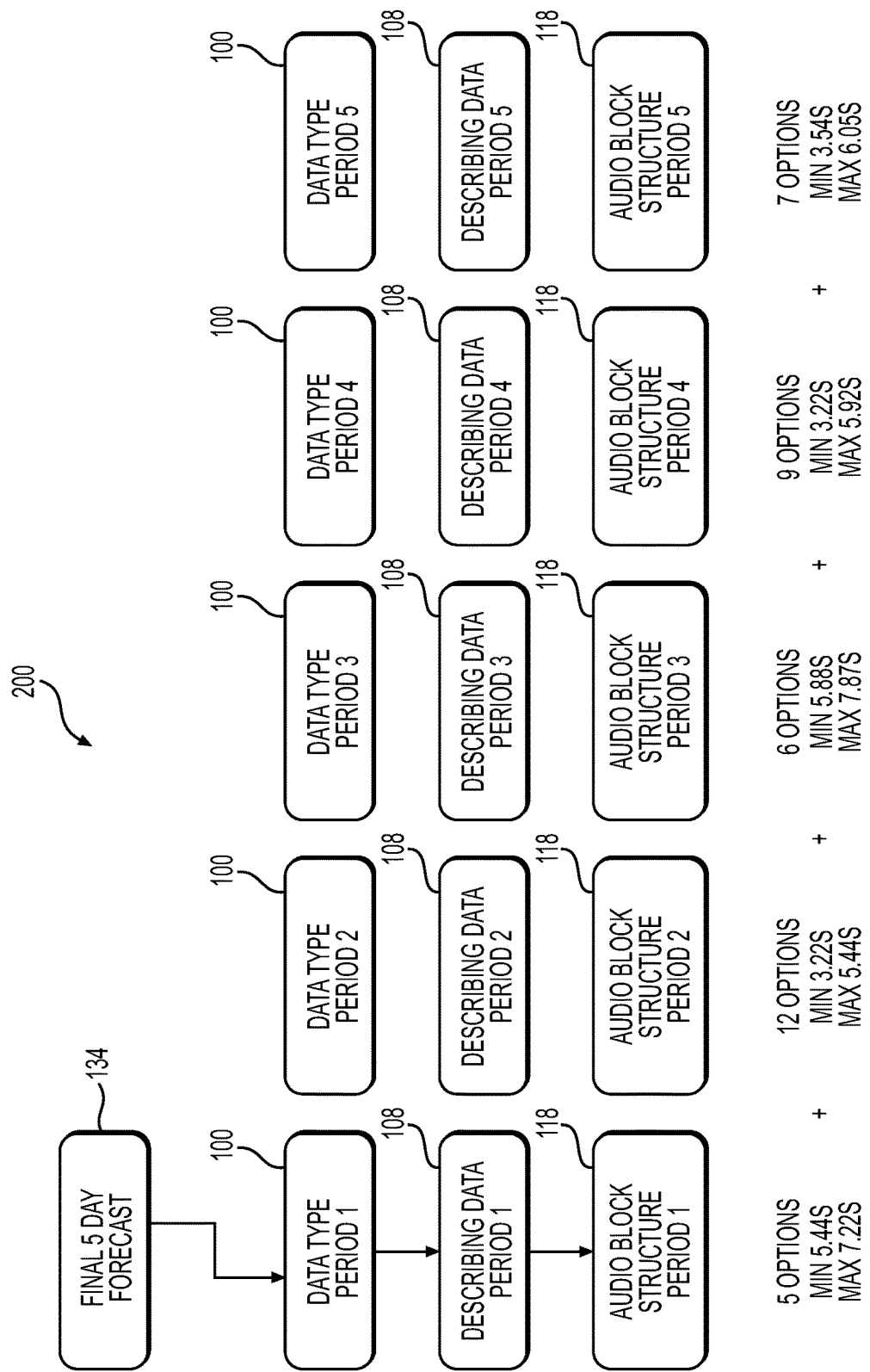
FIG. 4 is a flowchart illustrating the generation of audio files using the method of the flowchart of FIGS. 1 thru 3 for various "Data Types", "Describing Data", and "Audio Block Structures".

FIGS. 2 thru 4 describe the basic workflow of the simple data type 100, such as described above. FIG. 2 begins with ingesting data 202 such as text, automated messages such as recorded information, etc. from a data source 101 such as the national weather service, etc. In this particular embodiment, the ingested data is of the data type 100 'single period dry forecast' 104. The data is extracted (see reference numeral 103) into the single day dry forecast 104 describing data 108, which contains the following describing variables including temperature 110, periodDesc or dayperiod 117, clouds or cloud cover 112, windSpeed 114, and windDir 116, The 'single period dry forecast' 104 (e.g. a single day dry forecast) data type 100 has only one associated audio block structure 118 in this embodiment. This audio block structure 118 contains the following audio phrase types 120: maxt 122, dayp 124, wclouds 126, wind-s 128, and wind-d 130. Once the describing data 108 has been populated, and the audio block structure 118 is known, the describing data 108 is passed to the audio block structure 118 as shown in FIG. 2. The describing data 100 such as temperature 110 is passed to the audio phrase type 120 maxt 122, which represents a list of pre-recorded audio files 132 that can be used with the temperature 110 variable. At least one file will match. The same is then done with the remaining describing data 108 and their associated audio phrase types 120 within the audio block structure 118 as shown in FIG. 3. FIG. 4 shows the resulting audio files 136 acquired, and how they are finally merged to form a final audio file 134 for a single day dry forecast.

Figure 5:
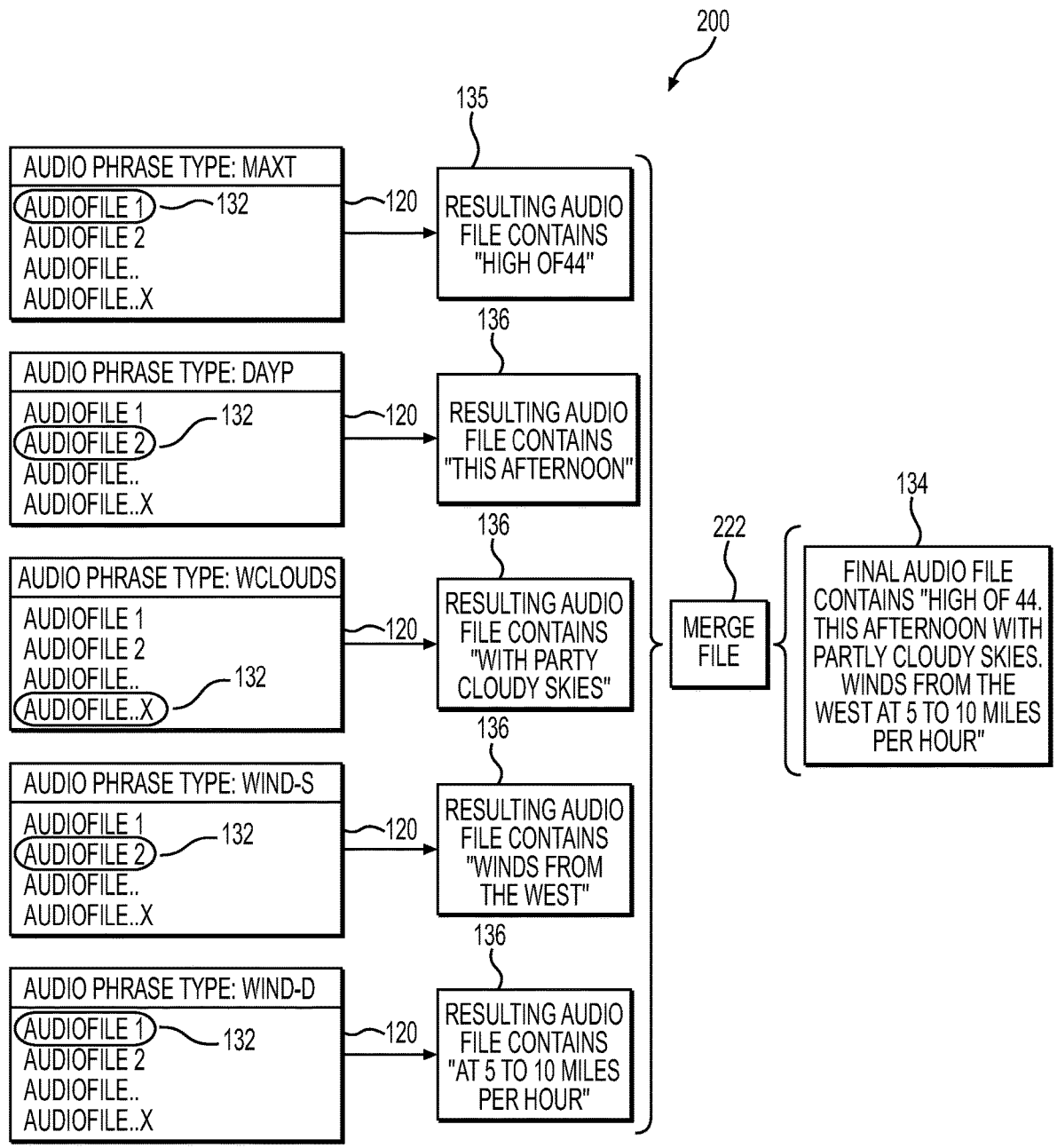
FIG. 5 is a flowchart depicting that the method of FIGS. 1 thru 4 May include a step of merging "resulting audio files" to create a "final audio file".
Figure 6:
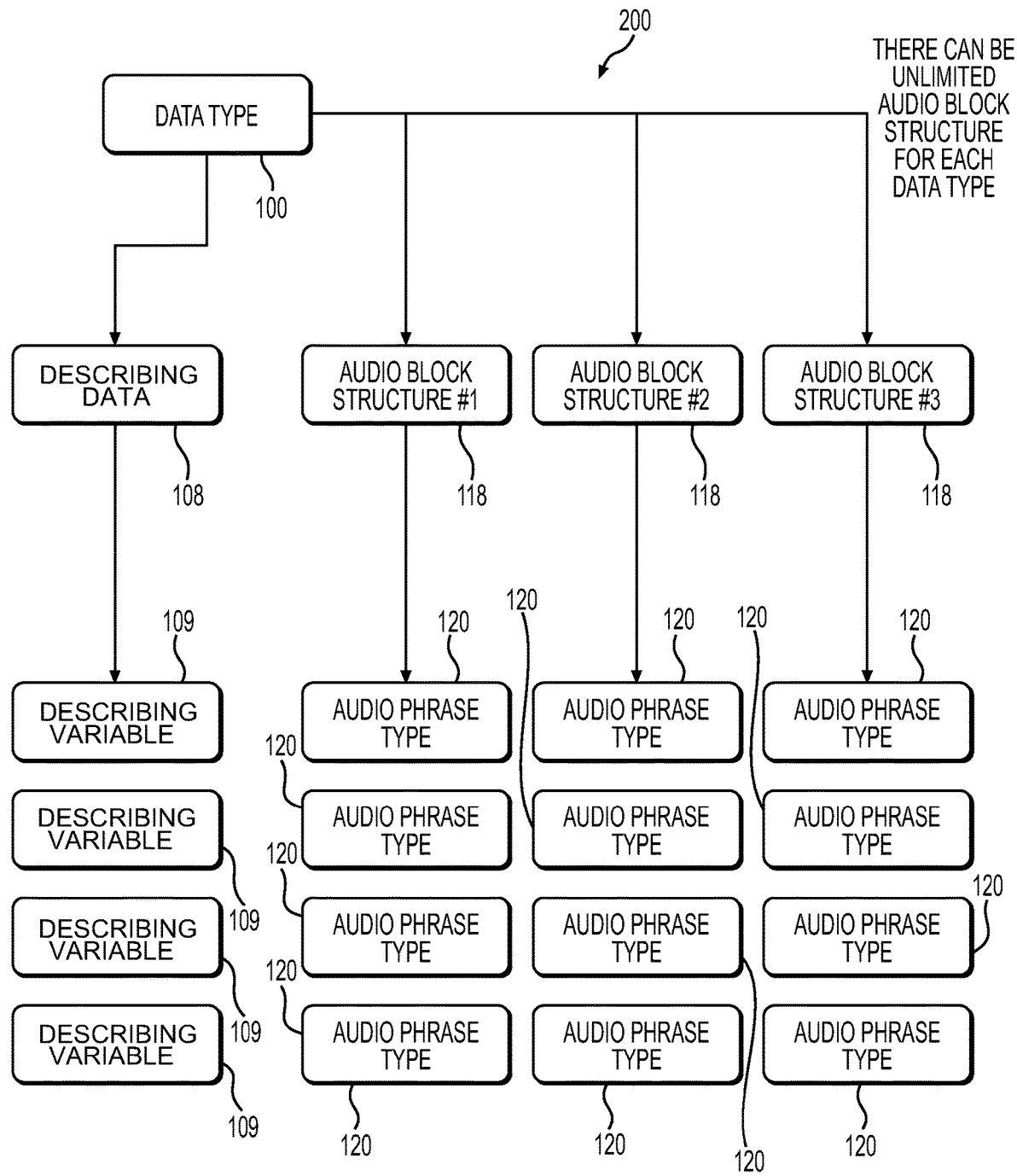
FIG. 6 is a flowchart elaborating on the method shown in FIG. 5, illustrating how multiple "Audio Phrase Types" may be matched to any particular "Audio Block Structure".

Variability is helpful to create a natural style human voiced meteorological audio content. There are many ways people describe or explain the same event or convey the same message in the same language. Varying the audio block structures 118 give the method flexibility for creating audio that says the same message, or explains the same event, but in a somewhat different way. This method 200 may use varying audio block structures 118 to reach two goals. First, this may make the final outputted audio more 'human' by saying messages in different ways as indicated in FIG. 5. Different people, even when speaking the same language, may not always say the same message the same way. Second, this may provide variability in time length of audio messages that describe the same event, weather condition(s) or occurrence as indicated in FIG. 6. This may allow the method to create audio describing the same message, but at a different length of time required for specific distribution channels. Referring back to FIG. 5, it shows how each data type 100 may have for single example of describing data 108 many audio block structures 118. Consequently, numerous versions of audio can be created from the same set of data.

Figure 7:
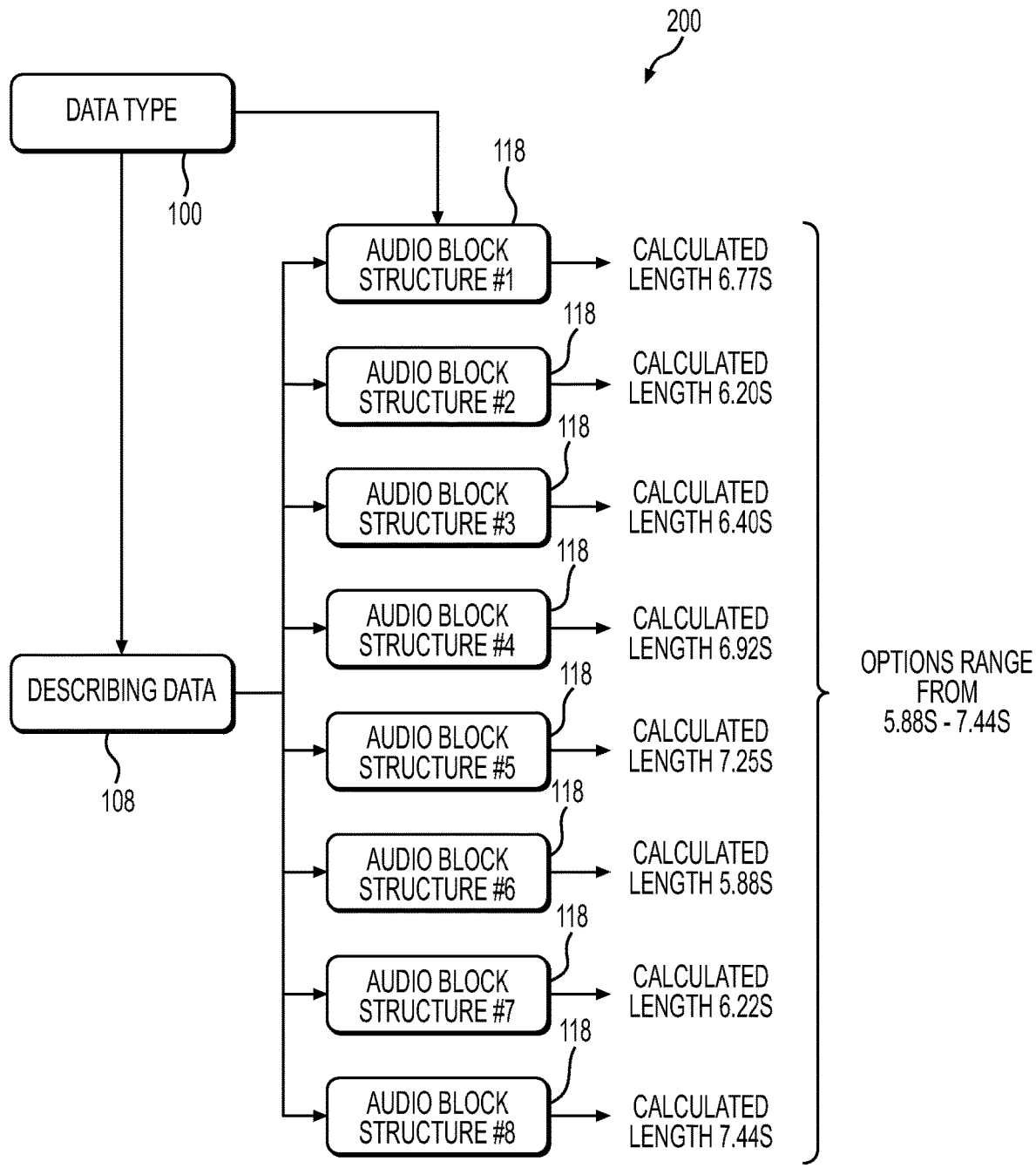
FIG. 7 is another flowchart elaborating on the method shown in FIG. 5, illustrating the "Audio Block Structures" and "Audio Phrase Types" may have calculated lengths of time and that is may be desirable that the lengths of time fall within a specified or desired range.

As shown by FIG. 7, the same concept may be used to create multiple versions representing the same data to modify the final audio file 134 to be of a specific length of time (i.e. within a desired tolerance or range). In some embodiments, before actually creating a final audio file 134, the final length of time of the audio file that may be created using any of the available options may be calculated as shown in FIG. 7. In many embodiments, the final audio file 134 is created from more than one data type 100. For example, a full audio forecast that contains a 5 day forecast would be the result of at least 5 separate data types 100. One for each forecast period.

As shown in FIG. 6, as the number of required data types 100 increases to satisfy the end product (i.e. the final audio file 134), the number of options increases exponentially, and the minimum and maximum audio length of time may range a greater amount. A final audio file 134 within that range can then be used. If no options match the desired length of time, padding of silence is used at the beginning, end, and at specific breakpoints within the audio. These points are referred to as breath breaks. These breath breaks may be placed between each data type 100 and/or describing data 108 where someone speaking naturally would take a breath, thus allowing for a brief pause of silence. As the data types 100 used for a final audio file 134 increases, the number of breath breaks may also increase to adjust the audio to fit within the allotted time range.

Figure 8:
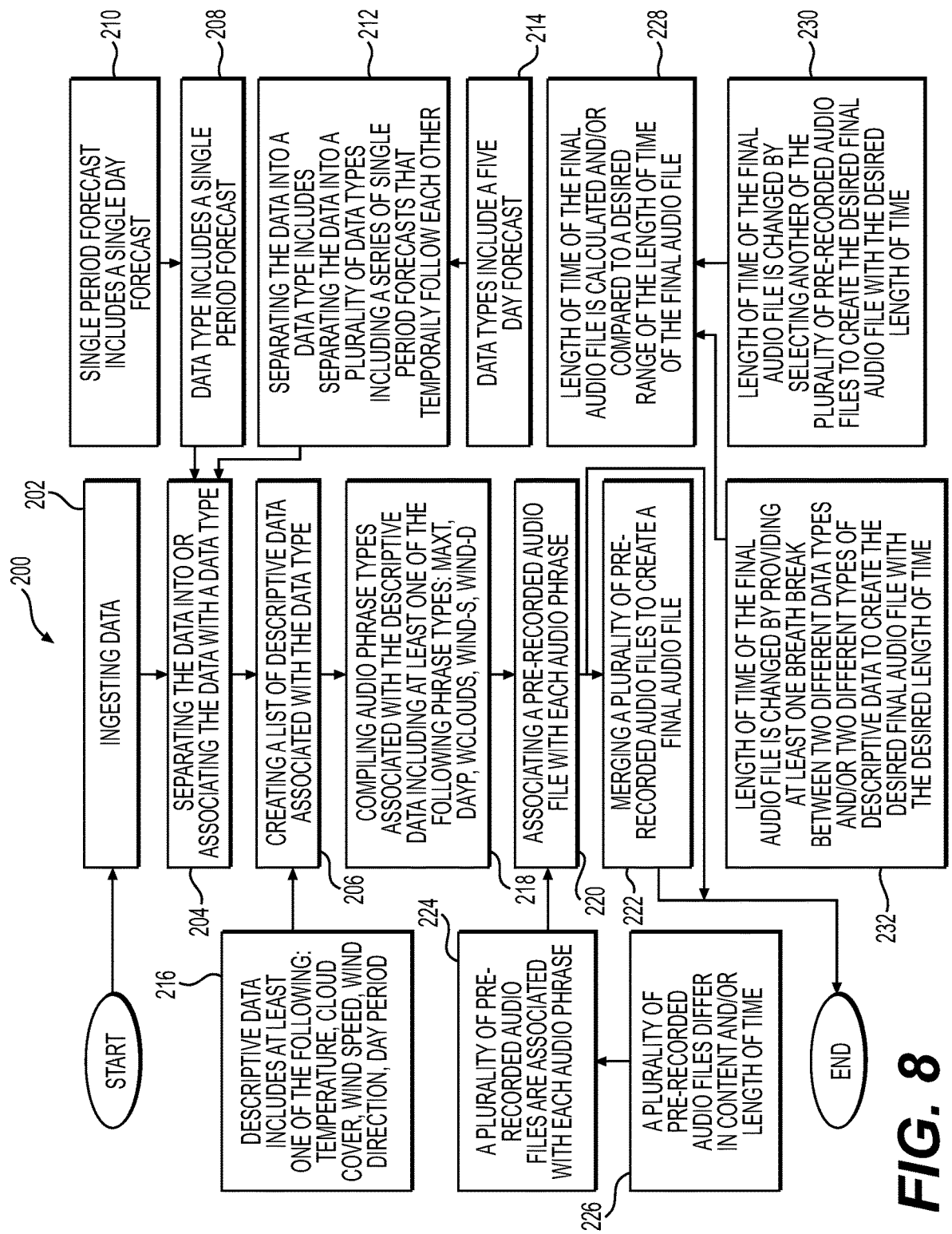
FIG. 8 is a flowchart illustrating a method for automatically translating raw data into real human voiced audio content according to another embodiment of the present disclosure, explaining the method in a more general manner.

Turning now to FIG. 8, an embodiment of the method 200 may be seen characterized in a more general manner. The method 200 may comprise ingesting data (step 202), separating the data into or associating the data with a data type (step 204), and creating a list of descriptive data associated with the data type (step 206).

In some embodiments, the data type includes a single period forecast (block 208). In yet further embodiments, the single period forecast includes a single day forecast (block 210). In other embodiments, the single period forecast includes a period of time less than or greater than a 24 hour period, etc.

In some embodiments, separating the data into a data type (step 204) includes separating the data into a plurality of data types including a series of single period forecasts that temporally follow each other (step 212). In such a case, the plurality of data types include a five day forecast (step 214).

In some embodiments, the descriptive data includes at least one of the following: temperature, cloud cover, wind speed, wind direction, day period (block 216).

In some embodiments, the method 200 further comprises compiling audio phrase types associated with the descriptive data including at least one of the following phrase types: maxt, dayp, wclouds, wind-s, and wind-d (block 218). In such a case, the method 200 may further comprise associating a pre-recorded audio file with each audio phrase (block 220). In some embodiments, the method 200 may further comprise merging a plurality of pre-recorded audio tiles to create a final audio file (step 222). In some embodiments, a plurality of pre-recorded audio files are associated with each audio phrase (block 224).

In some embodiments, the plurality of pre-recorded audio tiles differ in content and/or length of time (block 226). In such a case, the length of time of the final audio file is calculated and/or compared to a desired range of the length of time of the final audio file (step 228). Sometimes, the length of time of the final audio file is changed by selecting another of the plurality of pre-recorded audio files to create the desired final audio file with the desired length of time (step 230), In certain situations, the length of time of the final audio file is changed by providing at least one breath break between two different data types and/or two different types of descriptive data to create the desired final audio file with the desired length of time (step 232).

Industrial Applicability

In practice, a method, weather indicating device such as a portable weather or other information indicating device, a mobile app, an electronic control unit, a system using any of the aforementioned embodiments, etc. may be manufactured, bought, sold, or otherwise provided or obtained according to any embodiment discussed herein.

Figure 9:
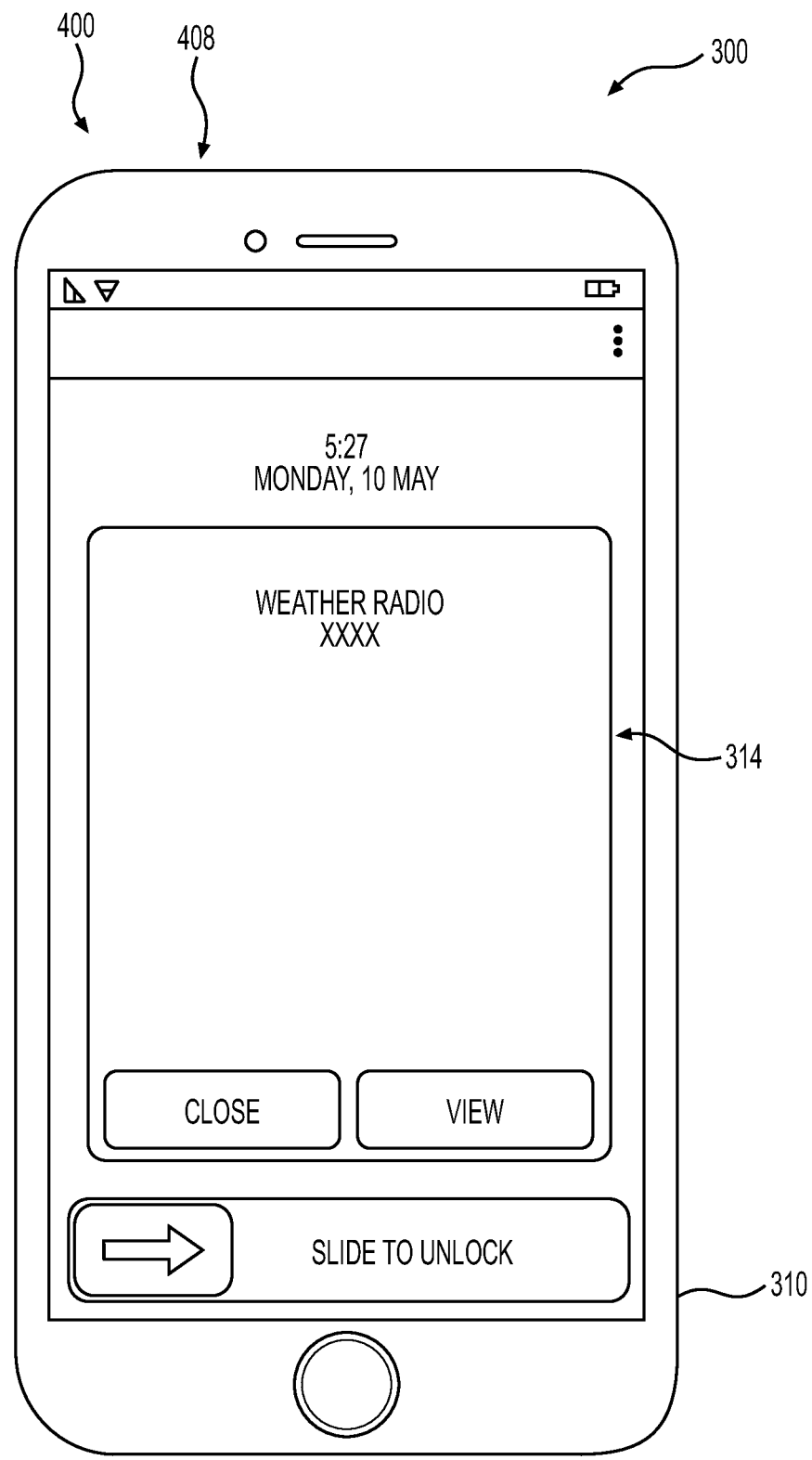
FIG. 9 is a front view of a portable weather indicating device according to an embodiment of the present disclosure.
Figure 10:
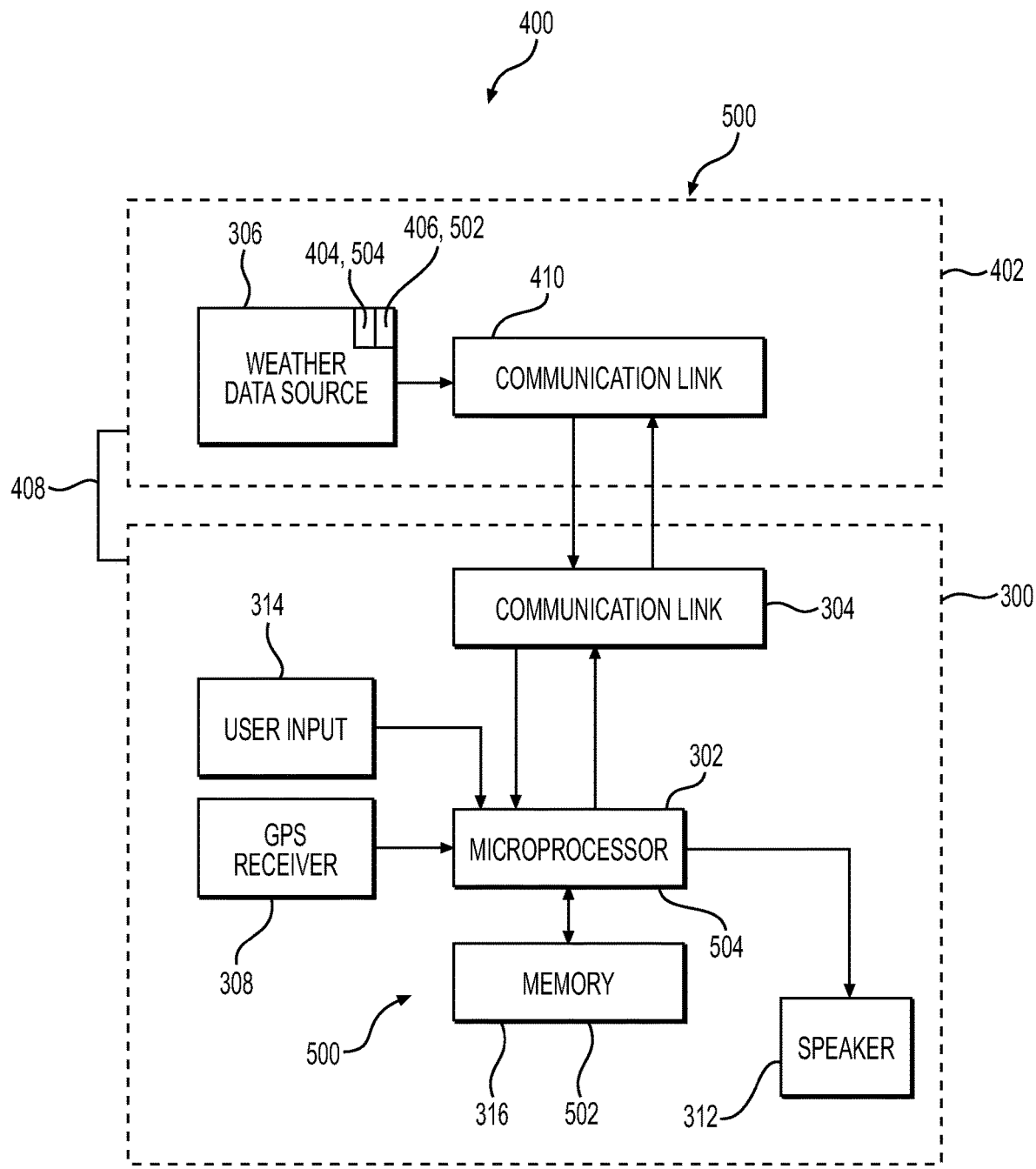
FIG. 10 is a schematic of a system according to an embodiment of the present disclosure employing a weather indicating device that may be used to implement various methods of the present disclosure.

FIGS. 9 and 10 show that a portable weather indicating device 300 may be provided according to various embodiments of the present disclosure. The device may use an internet browser to connect to a website or may be configured to use a mobile app, etc. that is configured to connect to a website that is configured to implement any method described herein. The device 300 may comprise a processor 302, a wireless communication link 304 coupled to the processor 302 for receiving weather data from a weather data source 306 (e.g. a base station) identified by at least one uniform resource locator (URL) accessible by the processor 302 and for transferring the weather data to the processor 302, a global location device 308 coupled to the processor 302 for determining the location of the portable weather indicating device 300, a housing 310 that contains the processor 302, the wireless communication link 304, the global location device 308, the housing 310 having dimensions configured to allow a person to hold the housing 310 in one hand, and a speaker 312 in communication with the processor 302. The processor 302 may be configured to cause the speaker 312 to emit a sound related to the final audio file produced by the any embodiment of the present disclosure.

The coordinates (i.e. longitude and latitude) obtained via the global location device 308 (e.g. GPS) may be communicated to the website at a base station 402 that includes a communication link processor 404 and memory 406 for executing the method of any embodiment discussed herein. Alternatively, the location may be selected by the user via an input device 314 (e.g. through audio recognition, keyboard, mouse, touchscreen, etc.).

The portable weather indicating device 300 may be selected from the group of products comprising cellular phones, portable computers, tablets and personal data assistants, etc. in such a case, the processor 404 performing the method is usually located at the base station 402 since the program configured to execute the method may be rather large in size (20 gigabytes or more). Other devises may also be used to implement the method including Voice Activated Home Automation systems such as AMAZON ECHO, ALEXA, GOOGLE HOME, etc. Computers large enough to store the instructions in memory and having powerful processors may also execute the method on site rather than remotely, etc.

In more general terms, a system 400 for implementing the method according to any embodiment discussed herein may comprise any weather indicating device 408, 300 with memory 406, 316 and a processor 404, 302 that are configured to execute the steps described herein. The weather indicating device 408 may be portable or stationary. In some embodiments, a portable weather indicating device 300 receives a final audio file from the base station 402 where the method according to any embodiment discussed herein has been performed. In other embodiments, the functionality of the base station 402 and portable weather indicating device 300 are combined to be performed at the same location, etc.

FIG. 10 also illustrates that an electronic controller unit 500 according to an embodiment of the present disclosure may comprise a memory including computer executable instructions for implementing the method according to any embodiment described herein and a processor 504 coupled to the memory 502 and configured to execute the computer executable instructions for implementing the method.

The method may be implemented by creating a computer program in any suitable programming language. Such programming languages include JAVA, C++, PHP, MYSQ, etc.

As can be seen, various embodiments of the method, system, device and/or electronic control unit as described herein may provide a way to take meteorological information and make it available in other distribution channels immediately, and in a far more palatable way. These embodiments may also provide the ability to force a specific length of the final audio file to fit restrictions in certain delivery channels that requite content at specific lengths. Other prior art methods fall short by either presenting a text-to-speech representation of the data which often lacks language specific emphasis on important variables, or having humans record audio representations of the information, which creates the problem of having a time lapse between when the information is made available and when the public can actually receive that information.

The method may provide a framework for ingesting meteorological data in the form of text or raw data and creating human voiced audio content describing and/or explaining the data in a way that is easily consumed or understood by the general public. This can be done either immediately when the data is received, as pre-scheduled triggers, or on demand when requested. The input data to the method may describe various conditions, forecasts, events, historical information, locations of storms, movement of storms, predicted hazards, current hazards etc. The created audio can then be used immediately in a variety of capacities including, but not limited to, radio, television, web based or mobile based applications, search, in response to voice activation services (ALEXA, CORTANA, SIRE etc).

The methods, systems, process flows and logic of disclosed subject matter associated with a computer readable medium may be described in the general context of computer-executable instructions, such as, for example, program modules, which may be executed by a computer device. Generally, program modules may include routines, programs, objects, components, data structures, etc. that perform particular tasks or implement particular abstract data types. Such modules are typically stored on a data storage media of the host computer device that is remotely or locally situated. The disclosed subject matter may also be practiced in distributed computing environments wherein tasks are performed by remote processing devices that are linked through a communications network. In a distributed computing environment, program modules may be located in local and/or remote computer storage media including memory storage devices.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

| List of Elements | |
|---|---|
| 100 | data type |
| 101 | data source |
| 102 | ingested data |
| 103 | extracted data |
| 104 | single period dry forecast |
| 106 | specified time length |
| 108 | describing data |
| 109 | describing variable |
| 110 | temperature |
| 112 | cloud cover |
| 114 | wind speed |
| 116 | wind direction |
| 117 | day period |
| 118 | audio block structures |
| 120 | audio phrase types |
| 122 | maxt |
| 124 | dayp |
| 126 | wclouds |
| 128 | wind-s |
| 130 | wind-d |
| 132 | pre-recorded audio file |
| 134 | final audio file |
| 136 | resulting audio files |
| 200 | method |
| 202 | ingesting data |
| 204 | separating data |
| 206 | creating a list of descriptive data |
| 208 | single period forecast |
| 210 | single day forecast |
| 212 | plurality of data types |
| 214 | five day forecast |
| 216 | examples of descriptive data |
| 218 | compiling audio phrases |
| 220 | associating a pre-recorded audio file with each phrase |
| 222 | merging a plurality of pre-recorded audio files |
| 224 | a plurality of pre-recorded audio files associated with each audio phrase |
| 226 | plurality of pre-recorded audio files different in content or time |
| 228 | compare desired range of the length of time of the final audio file |
| 230 | change the length of time of the final audio file by selecting another audio file |
| 232 | change the length of time of the final audio file by providing breath breaks |
| 300 | portable weather indicating device |
| 302 | processor |
| 304 | communication link |
| 306 | weather data source |
| 308 | global location device |
| 310 | housing |
| 312 | speaker |
| 314 | input device |
| 316 | memory |
| 400 | system |
| 402 | base station |
| 404 | processor |
| 406 | memory |
| 408 | weather indicating device |
| 410 | communication link |
| 500 | electronic control unit |
| 502 | memory |
| 504 | processor |

What is claimed is:

1. A method for automatically translating raw data into real human voiced audio content, the method comprising;
specifying a desired length of time of a final audio file;

ingesting data;
separating the data into or associating the data with a data type;
creating a list of descriptive data associated with the data type;
compiling audio phrase types associated with the descriptive data including at least one of the following phrase types: maxt, dayp, wclouds, wind-s, and wind-d;
associating a pre-recorded audio file with each audio phrase, wherein a plurality of pre-recorded audio files are associated with each audio phrase and wherein the plurality of pre-recorded audio files differ in content and/or length of time;
merging a plurality of pre-recorded audio files to create a merged audio file;
calculating a length of time of the merged audio file;
comparing the calculated length of time of the merged audio file to the desired length of time of the final audio file; and
inserting at least one breath break into the merged audio file to increase make the final audio file, wherein the at least one breath break increases the calculated length of time to be in the desired length of time of the final audio file, wherein the at least one breath break is inserted between two different data types and/or two different types of descriptive data to provide the final audio file with a natural style of a human voice and wherein the at least one breath break comprises a brief pause of silence.

2. The method of claim 1, wherein the data type includes a single period forecast.

3. The method of claim 2, wherein the single period forecast includes a single day forecast.

4. The method of claim 1, wherein separating the data into a data type includes separating the data into a plurality of data types including a series of single period forecasts that temporally follow each other.

5. The method of claim 4, wherein the data types include a five day forecast.

6. The method of claim 1, wherein the descriptive data includes at least one of the following: temperature, cloud cover, wind speed, wind direction, day period.

7. The method of claim 1, wherein the changing the calculated length of time of the merged audio file further comprises inserting another of the plurality of pre-recorded audio files to create the final audio file having the desired length of time.

8. A portable weather indicating device, comprising:
a processor;
a wireless communication link coupled to the processor for receiving weather data from a source identified by at least one uniform resource locator (URL) accessible by the processor and for transferring the weather data to the processor;
a global location device coupled to the processor for determining the location of the portable weather indicator;
a housing that contains the processor, the wireless communication link, the global location device, the housing having dimensions configured to allow a person to hold the housing in one hand; and
a speaker in communication with the processor;
wherein the processor is configured to cause the speaker to emit a sound related to a final audio file produced by a method which automatically translates raw data into real human voiced audio content, the method comprising:
specifying a desired length of time of the final audio file;
ingesting data;
separating the data into or associating the data with a data type;
creating a list of descriptive data associated with the data type;
compiling audio phrase types associated with the descriptive data including at least one of the following phrase types: mart, dayp, wclouds, wind-s, and wind-d;
associating a pre-recorded audio file with each audio phrase;
merging a plurality of pre-recorded audio files to create a merged audio file, wherein a plurality of pre-recorded audio files are associated with each audio phrase and wherein the plurality of pre-recorded audio files differ in content and/or length of time;
calculating a length of time of the merged audio file;
comparing the calculated length of time of the merged audio file to the desired length of time of the final audio file; and
inserting at least one breath break into the merged audio file to make the final audio file, wherein the at least one breath break increases the calculated length of time to be in the desired length of time of the final audio file, wherein the at least one breath break is inserted between two different data types and/or two different types of descriptive data to provide the final audio file with a natural style of a human voice and wherein the at least one breath break comprises a brief pause of silence.

9. The portable weather indicating device of claim 8, and wherein the changing the calculated length of time of the merged audio file further comprises inserting another of the plurality of pre-recorded audio files to create the final audio file having the desired length of time.

10. The portable weather indicating weather device of claim 8, wherein the portable weather indicating device is selected from the group of products comprising cellular phones, portable computers, tablets and personal data assistants.

11. An electronic controller unit comprising:
a memory including computer executable instruction for implementing a method for automatically translating raw data into real human voiced audio content; and
a processor coupled to the memory and configured to execute the computer executable instructions for implementing said method, wherein said method comprises:
specifying a desired length of time of the final audio file;
ingesting data:
separating the data into or associating the data with a data type; and
creating a list of descriptive data associated with the data type,
compiling audio phrase types associated with the descriptive data including at least one of the following phrase types: maxt, dayp, wclouds, wind-s, and wind-d,
associating a pre-recorded audio file with each audio phrase,
merging a plurality of pre-recorded audio files to create a merged audio file, wherein a plurality of pre-recorded audio files are associated with each audio phrase and wherein the plurality of pre-recorded audio files differ in content and/or length of time;

calculating a length of time of the merged audio file;

comparing the calculated length of time of the merged audio file to the desired length of time of the final audio file; and inserting at least one breath break into the merged audio file to increase make the final audio file, wherein the at least one breath break increases the calculated length of time to be in the desired length of time of the final audio file, wherein the at least one breath break is inserted between two different data types and/or two different types of descriptive data to provide the final audio file a natural style of a human voice and wherein the at least one breath break comprises a brief pause of silence.

12. The electronic controller unit of claim 11, and wherein the changing the calculated length of time of the merged audio file further comprises inserting another of the plurality of pre-recorded audio files to create the final audio file having the desired length of time.

* * * * *

UNITED STATES PATENT AND TRADEMARK OFFICE
CERTIFICATE OF CORRECTION

| | |
|---|---|
| PATENT NO. | : 11,430,423 B1 |
| APPLICATION NO. | : 16/386358 |
| DATED | : August 30, 2022 |
| INVENTOR(S) | : Derek Christopher Heit |

It is certified that error appears in the above-identified patent and that said Letters Patent is hereby corrected as shown below:

In the Claims

In Line 21 of Column 13, in Claim 1. delete "increase"
On Line 6 of Column 15, in Claim 11. delete "increase"

Signed and Sealed this
Twentieth Day of December, 2022

Katherine Kelly Vidal
*Director of the United States Patent and Trademark Office*